United States Patent
Yamazaki

(10) Patent No.: US 6,804,604 B2
(45) Date of Patent: Oct. 12, 2004

(54) NAVIGATION SYSTEM

(75) Inventor: Noboru Yamazaki, Iwaki (JP)

(73) Assignee: Alpine Electronics, Inc., Toyko (JP)

( * ) Notice: Subject to any disclaimer, the term of this patent is extended or adjusted under 35 U.S.C. 154(b) by 224 days.

(21) Appl. No.: 09/739,586

(22) Filed: Dec. 18, 2000

(65) Prior Publication Data

US 2001/0021895 A1 Sep. 13, 2001

(30) Foreign Application Priority Data

Dec. 24, 1999 (JP) .................................. 11-368501

(51) Int. Cl.⁷ .......................... G01C 21/00; G06G 7/78; B60Q 1/00
(52) U.S. Cl. ........................ 701/211; 701/202; 701/208; 701/209; 701/210; 340/905; 340/438
(58) Field of Search ................................. 701/211, 202, 701/208, 209, 210; 340/905, 438

(56) References Cited

U.S. PATENT DOCUMENTS

| | | | |
|---|---|---|---|
| 5,410,486 A | | 4/1995 | Kishi et al. .................. 701/211 |
| 5,862,509 A | * | 1/1999 | Desai et al. ................. 340/990 |
| 6,038,559 A | * | 3/2000 | Ashby et al. ................ 701/201 |
| 6,061,628 A | | 5/2000 | Hayashi et al. ............. 701/208 |
| 6,295,503 B1 | * | 9/2001 | Inoue et al. ................. 340/905 |
| 6,415,225 B1 | * | 7/2002 | Hiyokawa et al. .......... 340/988 |

* cited by examiner

Primary Examiner—Thomas G. Black
Assistant Examiner—Brian J. Broadhead
(74) Attorney, Agent, or Firm—Brinks Hofer Gilson & Lione

(57) ABSTRACT

There is provided a navigation system which enables efficient driving in a lane where advancing or leaving relative to other lanes of the road is restricted, such as for a carpool lane. Map data including road information regarding advancing/leaving points in a road having a carpool lane is read from a DVD 2, and stored in a data buffer 10. A route search processing section 32 used the map data stored in the data buffer 10 to perform route search processing, taking the availability of the carpool lane into consideration. When route guidance using the carpool lane is performed, a carpool lane guide section 18 performs predetermined lane change guidance visually and/or orally, at a timing when the advancing/leaving point at which the route is to be changed approaches within a predetermined distance from the position of the vehicle.

20 Claims, 9 Drawing Sheets

FIG.2(A)

NODE TABLE

| #0 NODE RECORD |
|---|
| #1 NODE RECORD |
| #2 NODE RECORD |
| ⋮ |

FIG.2(B)

CONNECTION NODE TABLE

| NORMALIZED LONGITUDE OF NODE |
|---|
| NORMALIZED LATITUDE OF NODE |
| ATTRIBUTE FLAG OF NODE |
| NUMBER OF NODES CONNECTED |
| NUMBER OF TRAFFIC CONTROL |
| ⋮ |
| #0 CONNECTED NODE RECORD (LINK NUMBER) |
| #1 CONNECTED NODE RECORD (LINK NUMBER) |
| ⋮ |
| #0 TRAFFIC CONTROL RECORD |
| #1 TRAFFIC CONTROL RECORD |
| ⋮ |
| ADJACENT NODE RECORD |
| STORAGE POSITION OF INTERSECTION RECORD |
| SIZE OF THE CONCERNED INTERSECTION RECORD |

FIG.2(C)

| LINK TABLE | LINK RECORD |
|---|---|
| #0 LINK RECORD | LINK ID |
| #1 LINK RECORD | NODE NO.1 |
| #2 LINK RECORD | NODE NO.2 |
| ⋮ | DISTANCE |
| | COST |
| | ROAD ATTRIBUTE FLAG |
| | ROAD TYPE FLAG |
| | ROUTE NO. |
| | ⋮ |

NAVIGATION SYSTEM

BACKGROUND OF THE INVENTION

1. Field of the Invention

The present invention relates to a navigation system which provides a display of a map image for the area around the position of a vehicle, various route guidance instructions and the like.

2. Description of the Related Art

Navigation systems for vehicles generally determine the present position of the vehicle, read map data in the vicinity thereof from a data storage medium such as CD, DVD or the like, and display the map data on a screen. On the screen, there is displayed a vehicle position mark showing the present position of the vehicle. As the vehicle is driven, the map data in the vicinity of the vehicle is scrolled, centering on the vehicle position mark, so that map information in the vicinity of the present position of the vehicle can be obtained all the time.

Moreover, most of the recent navigation systems for vehicles are provided with a route guidance function which makes it possible for a user to drive toward a desired destination without taking a wrong road. According to this route guidance function, a route connecting from a departure point to a destination with the smallest cost is automatically searched using map data by performing a simulation, such as a breadth-first search (BFS) method or a Dijkstra's method, and the searched route is stored as a guidance route. Then, during driving, the guidance route is displayed on the screen by changing the color from that of other roads or drawing thicker on the map image, and displaying an enlarged map of the intersection into which the vehicle is advancing next or outputting spoken guidance instructions, to thereby guide the user to the destination.

In some roads or expressways in the United States, there is a lane referred to as carpool lane where only vehicles in which there are two or more passengers can travel. In the United States, since there is a relatively large number of vehicles in which there is no passenger other than the driver, this carpool lane is less congested compared to normal lanes, and vehicles in which two or more passengers are traveling can travel this lane to thereby reduce the traveling time considerably.

However, advancing into the carpool lane from the normal lane (hereinafter referred to as "ordinary lane") and leaving the carpool lane for the ordinary lane can only be performed at a predetermined advancing/leaving point. Accordingly, there arises the case where even if a driver of a vehicle traveling in the carpool lane knows that he/she is approaching the road exit, by means of a map image around the position of the vehicle displayed on a screen of the navigation system or by using the route guidance function, since there is no leaving point from the carpool lane to the ordinary lane, the driver cannot return to the ordinary lane and consequently passes the road exit. In particular, in expressways around large cities where there are a large number of ordinary lanes, such an inconvenience is likely to occur. To avoid such an inconvenience, it is better to return early to the ordinary lane from traveling in the carpool lane. However, if there are many leaving points before the expressway exit, returning early to the ordinary lane causes the problem that efficient driving cannot be performed. Such a problem may also occur not only in the case of driving in a carpool lane, but also in ordinary lanes where traffic between each other is restricted.

SUMMARY OF THE INVENTION

In view of the above situation, it is an object of the present invention to provide a navigation system which can make it possible to drive efficiently in lanes where advancing or leaving relative to other lanes is restricted.

To solve the above-described problems, the navigation system of the present invention stores map data including road information regarding a partial lane in a map data storage section, where a partial lane is one of a plurality of lanes constituting the road and advancing or leaving relative to other lanes is permitted only in a predetermined authorized section. The system performs a predetermined navigation operation by means of a navigation processing section, based on the position of the vehicle detected by a vehicle position detecting section and the map data stored in the map data storage section. The navigation operation is performed while taking into consideration restrictions regarding advancing and leaving relative to a partial lane in a plurality of lanes, thereby enabling efficient driving in a lane having such a restriction.

The above-described navigation processing section preferably judges the timing for performing a predetermined guidance notification regarding the authorized section, based on the position of the vehicle and the position of the above-described authorized section, and performs guidance notification by means of a guidance notification section at this timing. As a specific navigation operation, since guidance notification is performed regarding the above-described authorized section where advancing or leaving is permitted, partial lanes where advancing or leaving is restricted can be efficiently utilized by driving a vehicle while referring to this guidance notification.

Moreover, a user may set whether or not to use the above-described partial lane by means of a driving lane instruction section. Route search processing by a route search processing section included in the navigation processing section takes into consideration whether or not to use the partial lane depending on the setting made in the driving lane instruction section. As a specific navigation operation, by performing the route search processing using the above-described partial lane, the most efficient driving condition can be effectuated. Furthermore, since the availability of the above-described partial lane is optional, when there is a predetermined condition for its use, users can freely select whether they will drive in this partial lane or not depending on the situation at that time.

Specifically, the above-described partial lane may be the carpool lane designated in some roads in the United States. The availability of the carpool lane is determined according to the number of passengers in the vehicle, and the carpool lane is less congested compared to other lanes. However, advancing or leaving relative to an ordinary lane is possible only in a predetermined authorized section. Since various navigation operations can be performed with the road information regarding the carpool lane being included in the map data, efficient driving utilizing the carpool lane becomes possible.

BRIEF DESCRIPTION OF THE DRAWINGS

FIG. 2 is a diagram showing the detailed contents of various tables included in a road unit.

DETAILED DESCRIPTION OF THE INVENTION

A navigation system in one embodiment to which the present invention is applied will now be described, with reference to the drawings. In this embodiment, a designated carpool lane, such as is found on some roads in the United States, is assumed as one example of a partial lane in a plurality of lanes constituting the road, where advancing or leaving between the partial lane and other lanes is permitted only in a predetermined authorized section. It is also assumed that on a road including the carpool lane, "advancing/leaving points" as authorized sections where advancing or leaving is possible between the carpool lane and ordinary lanes are set for every predetermined interval.

(1) Overall Construction of the Navigation System

Figure 1:
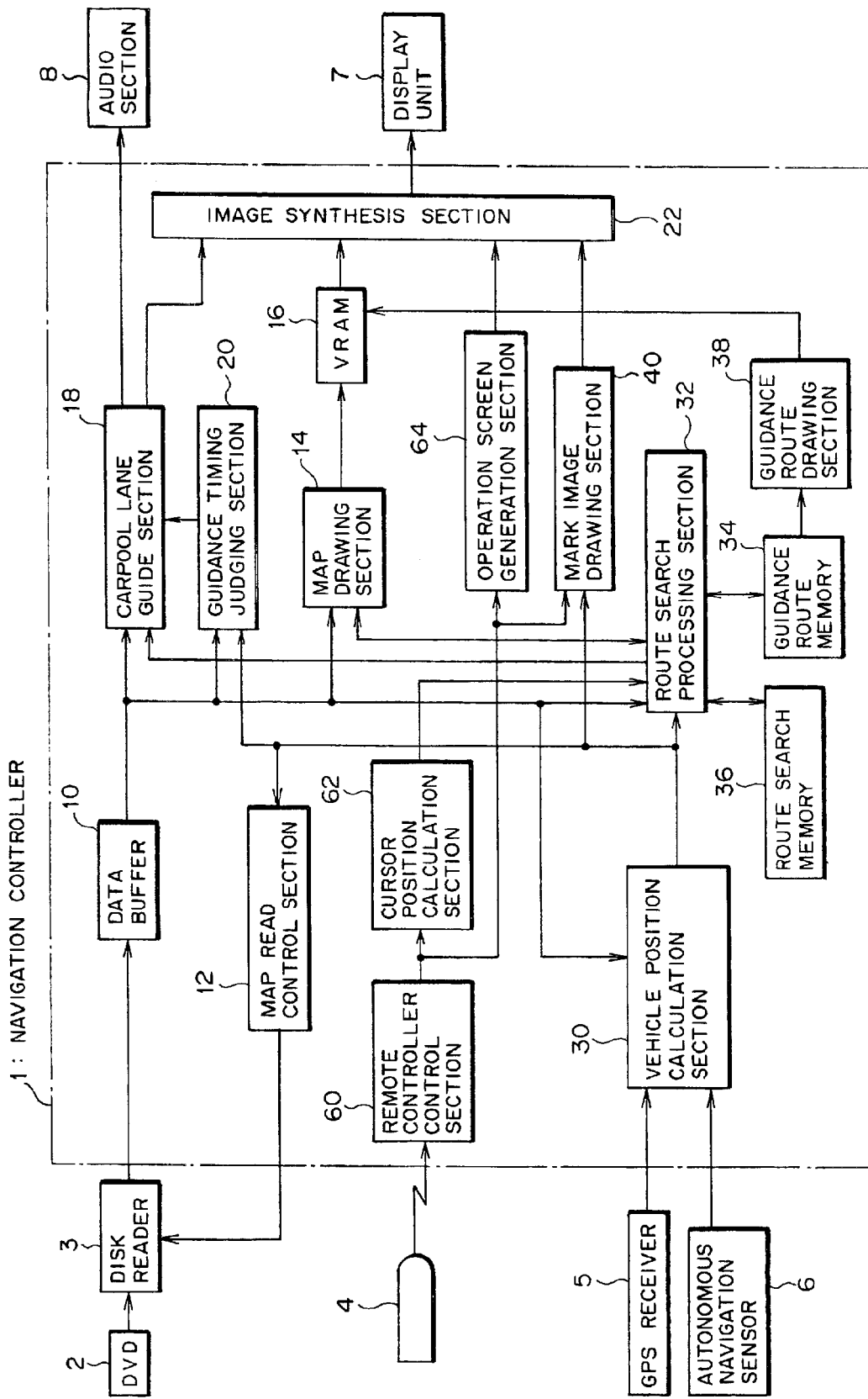
FIG. 1 is a diagram showing the overall construction of one embodiment of a navigation system for vehicles according to the present invention.

FIG. 1 is a diagram showing the overall construction of one embodiment of a navigation system for vehicles in which the present invention is applied. The navigation system shown in FIG. 1 comprises a navigation controller 1 for overall control, a DVD 2 in which various map data necessary for map display and route searching are stored, a disk reader 3 for reading out the map data stored in the DVD 2, a remote control unit 4 as an operation section for a user to input various instructions, a GPS receiver 5 and an autonomous navigation sensor 6 for detecting the position of the vehicle and the azimuth of the vehicle, a display unit 7 for displaying map images, guidance routes or the like, and an audio section 8 for outputting predetermined spoken guidance instructions.

The above-described disk reader 3 is capable of being loaded with a single or a plurality of DVDs 2, and reads out map data from any of the DVDs 2 under control of the navigation controller 1. The disk loaded therein is not always a DVD, and may be a CD. Alternatively, either a DVD or a CD may be loadable selectively.

The remote control unit 4 comprises various operation keys, such as a search key for giving an instruction for route searching, a route guidance mode key used for setting the route guidance mode, a destination input key, relative position cursor keys, reduction/enlargement keys for the map, and a setting key for selecting the item at the cursor position on the display screen, and transmits an infrared signal corresponding to the operation condition of these keys to the navigation controller 1. The setting of whether or not the carpool lane should be taken into consideration at the time of route guidance, whether or not guidance regarding the advancing/leaving points should be performed when the route guidance is not being performed, or the like, is also performed by operating the remote control unit 4.

The GPS receiver 5 receives radio waves transmitted from a plurality of GPS satellites, calculates the absolute position and azimuth of the vehicle by performing a three-dimensional positioning processing or a two-dimensional positioning processing (by calculating the vehicle azimuth based on the position of the vehicle at the present point and the position of the vehicle before one sampling time ΔT), and outputs these together with the positioning time. Moreover, the autonomous navigation sensor 6 comprises an angle sensor, such as vibrational gyroscope, for detecting a turning angle of the vehicle as a relative bearing, and a range sensor for outputting one pulse for each predetermined travel distance, to thereby calculate the relative position and azimuth of the vehicle.

The display unit 7 displays a map image for the area around the vehicle together with a vehicle position mark, a departure point mark, a destination mark or the like, and displays a guidance route on this map, based on the image data output from the navigation controller 1.

(2) Detailed Contents of the Map Data

The map data stored in the DVD 2 will now be described in detail. The map data stored in the DVD 2 is based on a unit of rectangular pattern divided by a predetermined longitude and latitude, and the map data in each pattern is identified by specifying a pattern number, and becomes readable. In the map data in each pattern, there are included a "drawing unit" consisting of various data necessary for map display, a "road unit" consisting of data necessary for various processing such as map matching, route search and route guidance, and an "intersection unit" consisting of detailed data of intersections or the like. The above-described drawing unit also includes data of a background layer necessary for displaying buildings, rivers or the like, and data of a character layer necessary for displaying names of cities, towns and villages, road names or the like.

Moreover, in the above-described road unit, a line connecting a certain intersection in the road and another adjacent intersection is referred to as a link, and an intersection connecting two or more links is referred to as a node. The road unit also includes a "unit header" for identifying that it is a road unit, a "connection node table" in which detailed data of all nodes are stored, a "node table" showing a storage position in the connection node table, and a "link table" in which detailed data of links identified by adjacent two nodes are stored.

FIG. 2 is a diagram showing the detailed contents in various tables included in the road unit. The node table stores, as shown in FIG. 2(A), node record #0, #1, . . . corresponding to all nodes included in the pattern that is now being viewed. Each node record is given a node number in an order of arrangement from #0, and shows the storage position in the connection node table corresponding to each node.

The connection node table includes, as shown in FIG. 2(B), for each of the existing nodes:

a. Normalized longitude/latitude;

b. "Attribute flag of node" comprising an intersection node flag showing whether this node is an intersection node or not, an adjacent node flag showing whether this is a node at a boundary with other patterns, a flag showing whether this is a node corresponding to the above-described advancing/leaving point, or the like;

c. "Number of nodes being connected" which shows the number of nodes constituting one end, when there is a link designating this node as the other end thereof;

d. "Number of traffic control", if there is traffic control such as right turn prohibition, U-turn prohibition or the like in the link connected to this node;

e. Connection node record for the number of links, showing the link number of each link to which this node is connected at one end;

f. Traffic control record showing the specific contents of the traffic control corresponding to the number, when the above-described traffic control exists;

g. "Adjacent node record" showing the position in the connection node table of the corresponding node in the adjacent pattern, when this node is one at the boundary with other patterns; and h. Storage position and size of the corresponding intersection record in the intersection unit, when this node is the intersection node.

Moreover, the link table includes, as shown in FIG. 2(C), a plurality of link records in the order of the link number corresponding to all links included in the pattern that is now being viewed. These respective link records include:

a. Link ID which is a code given to each link mainly for the route search display;

b. Node No. 1 and Node No. 2 for identifying two nodes located at the opposite ends of the link;

c. Distance of the link;

d. Cost when driving this link;

e. Various road attribute flags including attribute information of the road accompanying this link (such as presence or absence of one-way traffic);

f. Road type flag showing the type of the road, such as if the actual road corresponding to this link is an expressway or an ordinary road, if it is a carpool lane or not, or if it is a road corresponding to the advancing/leaving point, or the width of the road showing how many meters the width of the road is; and g. Route number given to the road corresponding to this link.

(3) Detailed Construction and Operation of Navigation Controller

The detailed construction of the navigation controller 1 shown in FIG. 1 will now be described. The navigation controller 1 comprises: a data buffer 10 for displaying a predetermined map image, a lane guidance image for the advancing/leaving point, or the like on the display unit 7; a map read control section 12; a map drawing section 14; a VRAM 16; a carpool lane guide section 18; a guidance timing judging section 20; an image synthesis section 22; a vehicle position calculation section 30 for performing calculation of the position of the vehicle, map matching processing, route search processing and route guidance processing, as well as displaying the results; a route search processing section 32; a guidance route memory 34; a route search memory 36; a guidance route drawing section 38; a mark image drawing section 40; a remote control section 60 for displaying various operation screens to a user and transmitting operation instructions from the remote control unit 4 to each section; a cursor position calculation section 62; and an operation screen generation section 64.

The data buffer 10 is for temporarily storing map data read from the DVD 2 by the disk reader 3. When the position of the vehicle is calculated by the vehicle position calculation section 30, the map read control section 12 transmits to the disk reader 3 a read request for the map data in a predetermined range including this position of the vehicle, reads the map data necessary for map display from the DVD 2, and stores the data in the data buffer 10.

The map drawing section 14 prepares map image data necessary for display, based on the drawing unit included in the map data stored in the data buffer 10. The prepared map image data is stored in the VRAM 16.

The carpool lane guide section 18 is for performing guidance regarding the advancing/leaving points, and prepares a lane guide map regarding the advancing/leaving points and displays it on the screen of the display unit 7, as well as orally guiding the traveling direction through an audio section 8. As for the timing of performing this guidance, if route guidance is being performed, a predetermined guidance is performed when the vehicle approaches within a predetermined distance (for example, within 1 km) of the advancing/leaving point where the lane change is to be carried out on the guidance route. If route guidance is not being performed, when the vehicle approaches within a predetermined distance from the advancing/leaving point existing ahead in the traveling direction of the vehicle, guidance is performed regarding the advancing/leaving point the vehicle is approaching.

When route guidance is not being performed, the guidance timing judging section 20 judges if the advancing/leaving point existing ahead in the traveling direction of the vehicle is within a predetermined distance from the position of the vehicle, and if it is within a predetermined distance, outputs an instruction to the carpool lane guide section 18 so as to perform guidance regarding the advancing/leaving point.

The image synthesis section 22 performs image synthesis by overlapping map image data read from the VRAM 16 and image data output respectively from the carpool lane guide section 18, guidance route drawing section 38, the mark image drawing section 40 and the operation screen generation section 64, and outputs the synthesized image data to the display unit 7.

The vehicle position calculation section 30 calculates the position of the vehicle based on each detection data of the GPS receiver 5 and the autonomous navigation sensor 6, and when the calculated position of the vehicle is not on the road in the map data, a map matching processing is performed for modifying the position of the vehicle. The route search processing section 32 searches for a driving route connecting between the preset destination and departure point under a predetermined condition. For example, under various conditions such as the shortest distance, the shortest time and the like, the guidance route is set so that the cost is minimum. As a typical method of route searching, Dijkstra's method and breadth-first search method are known. The guidance route set by the route search processing section 32 in this manner is expressed as a set of nodes from the departure point to the destination and stored in the guidance route memory 34.

The route search memory 36 is for storing data of the intersection network list required for route searching, and the stored data is read by the aforementioned route search processing section 32 to thereby perform a predetermined route search processing.

The guidance route drawing section 38 chooses one included in the map area drawn on the VRAM 16 at that point in time, among the guidance route data set by the route search processing section 32 and stored in the guidance route memory 34, to prepare guidance route drawing data for display, by overlapping the guidance route on the map image. The mark image drawing section 40 generates a vehicle position mark at the position of the vehicle after having been subjected to the map matching processing, and generates a cursor mark having a predetermined shape.

The above-described data buffer 10 corresponds to the map data storage section; the GPS receiver 5, the autonomous navigation sensor 6 and the vehicle position calculation section 30 correspond to the vehicle position detection section; and the whole navigation controller 1 corresponds to the navigation processing section. Also, the guidance timing judging section 20 corresponds to the timing judging section, the carpool lane guide section 18 corresponds to the guidance notification section, the remote control unit 4 and the remote control section 60 correspond to the driving lane instruction section, and the route search processing section 32 corresponds to the route search processing section.

The entire navigation system and the navigation controller 1 have the above-described construction. An outline of the advancing/leaving point and a method for setting information of nodes and links corresponding to the advancing/leaving points will now be described.

Figure 3A:
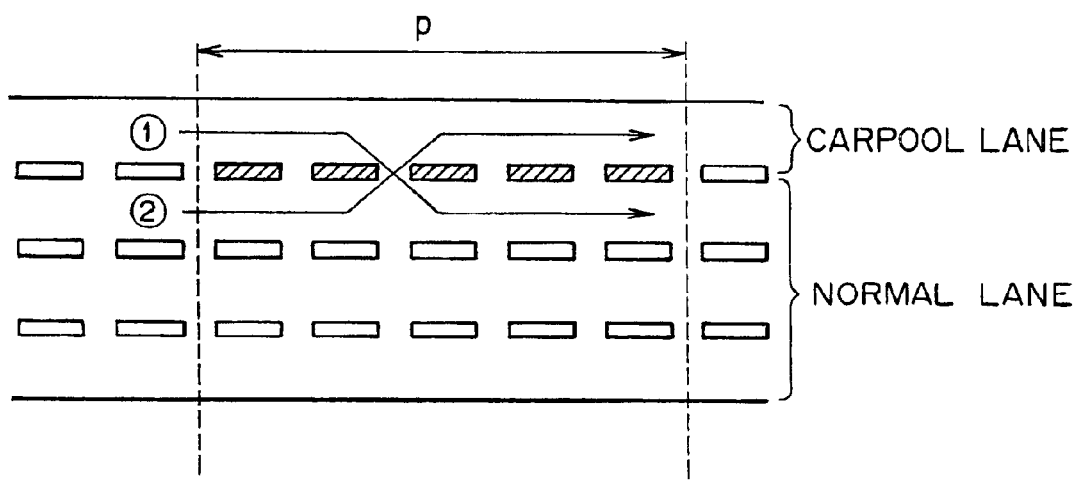
FIG. 3 is a diagram illustrating a method for setting advancing/leaving points and information of nodes and links corresponding to these advancing/leaving points.

FIG. 3 is a diagram illustrating a method for setting advancing/leaving points and information of nodes and links corresponding to these advancing/leaving points. FIG. 3(A) schematically represents the advancing/leaving point, and it is assumed that the vehicle travels from the left to the right in the figure. Of the four lanes shown in FIG. 3(A), the innermost lane (the uppermost lane at the position in the figure) corresponds to the carpool lane, and other three lanes correspond to ordinary lanes. Also, p corresponds to the advancing/leaving point, and within the section of this advancing/leaving point p, the borderline between the carpool lane and the ordinary lane (a line dividing the lanes) is shown in a color different from other borderlines. At this advancing/leaving point p, (1) vehicles traveling in the carpool lane may leave the carpool lane for the ordinary lane, and (2) vehicles satisfying a predetermined condition (for example, two or more passengers) may advance into the carpool lane from the ordinary lane.

Accordingly, at the time of route guidance, for example, when the vehicle traveling in the carpool lane approaches within a predetermined distance of an expressway exit on the guidance route, guidance regarding the advancing/leaving point is performed, in order to leave the carpool lane and advance toward the expressway exit (normally connected to the outermost lane). Moreover, even when route guidance is not being performed, for example, it is preset whether guidance regarding the advancing/leaving points is to be performed or not, and in the case where it is preset to perform guidance, the guidance regarding the advancing/leaving points is performed.

Figure 3B:
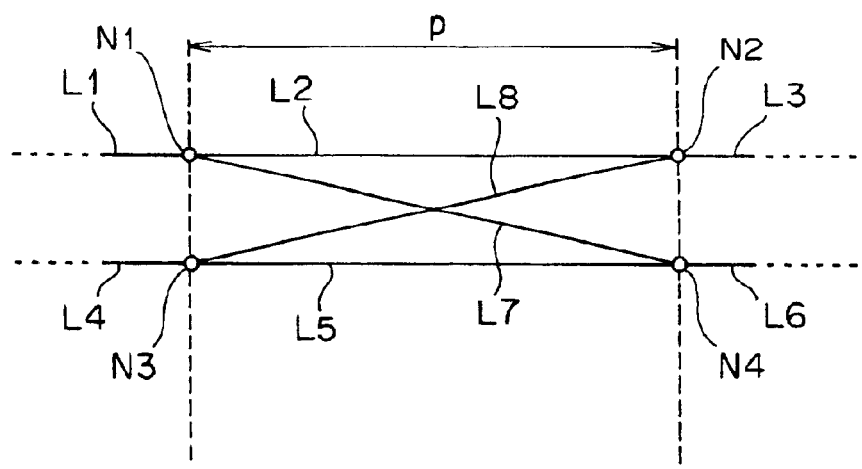

Furthermore, FIG. 3(B) is a diagram illustrating information regarding nodes and links corresponding to the vicinity of the advancing/leaving points, "O" represents a node, and a straight line represents a link. In FIG. 3(B), links L1 to L3 correspond to the carpool lane, and links L4 to L6 correspond to the ordinary lane. Also, nodes N1, N2, N3 and N4 are nodes set corresponding to the advancing/leaving point p. Link 7 also corresponds to the route (1) in FIG. 3(A), described above, that is, a route when a vehicle leaves the carpool lane for the ordinary lane, and link L8 corresponds to the route (2) in FIG. 3(A), described above, that is, a route when a vehicle advances from the ordinary lane into the carpool lane. In this embodiment, information regarding corresponding nodes and links is set, assuming that the advancing/leaving point is similar to an intersection in the normal route search processing. Specifically, as in the example shown in FIG. 3(B), node information and link information are stored by dividing one expressway into the carpool lane and the ordinary lane. With respect to the advancing/leaving point, as shown in the above-described links L7 and L8, link information regarding a route when advancing/leaving is performed between the carpool lane and the ordinary lane is also stored. Accordingly, when the vehicle traveling along the guidance route including the carpool lane approaches the expressway exit, an adequate advancing/leaving point can be selected to perform the lane change guidance.

With regard to the costs set for the above-described links L1 to L8, the average speeds when the vehicle travels in the carpool lane and in the ordinary lane are taken into consideration, and the cost for the links L1 to L3 corresponding to the carpool lane is set lower than the cost corresponding to the ordinary lane L4 to L6. The cost for the links L7 and L8 corresponding to the route when advancing or leaving is performed may be set at a value averaging the cost for the above-described links L1 to L3 and the cost for the links L4 to L6.

A specific example of a case where route searching is performed using information of nodes and links set as shown in FIG. 3 will be described. Here, a description is made focusing only on a route advancing into an expressway from a predetermined entrance until leaving the expressway from a predetermined exit, in the case where an expressway comprising a carpool lane is included in the guidance route.

Figure 4A:
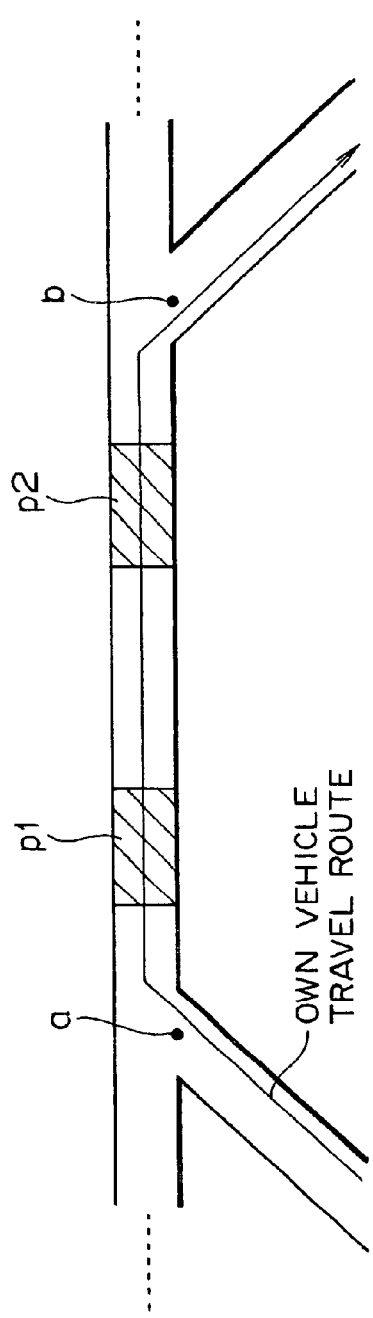
FIG. 4 is a diagram illustrating a specific example in which route search is performed, taking a carpool lane into consideration.
Figure 4B:
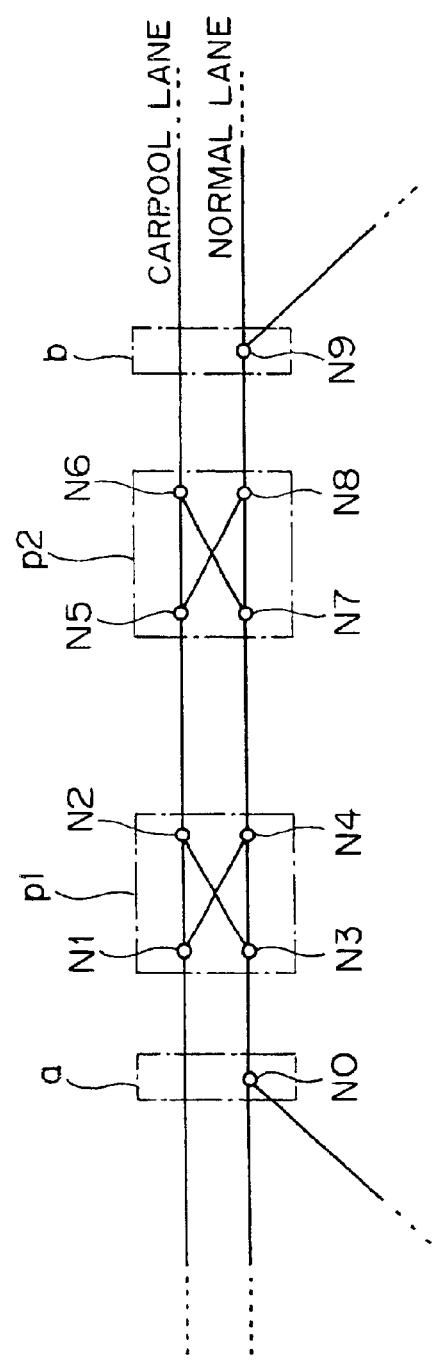

FIG. 4 is a diagram illustrating a specific example when a route search is performed, taking a carpool lane into consideration. FIG. 4(A) is a diagram schematically showing a route advancing into an expressway from a predetermined entrance a until leaving the expressway from a predetermined exit b, and areas p1 and p2 show the advancing/leaving points. FIG. 4(B) represents nodes and links corresponding to the expressway portion shown in FIG. 4(A). As described above, each node is represented by "O", and each link is represented by a straight line. As possible routes advancing into the expressway from a predetermined entrance a until leaving the expressway from a predetermined exit b, there are two cases: a case where the carpool lane is used and a case where the carpool lane is not used, and hence those will be described separately.

When it is set so that the carpool lane is used to perform route searching, route searching can be performed for all of the respective nodes N1 to N8 shown in FIG. 4(B). In this case, since a lower cost is set for the link corresponding to the carpool lane compared to the links corresponding to the ordinary lane, it is determined that the route represented by the set of nodes of {N0, N3, N2, N5, N8, N9} is the guidance route of the lowest cost.

Moreover, when it is set so that the carpool lane is not used to perform route searching, each node N1, N2, N5, N6 corresponding to the carpool lane will not be included for the route search, and hence a route represented by the set of nodes of {N0, N3, N4, N7, N8, N9} is obtained as the guidance route.

As described above, in this embodiment, information of nodes and links regarding an expressway comprising a carpool lane is set and stored in the DVD 2 by a method described above and shown in FIG. 3 or the like, and data corresponding to this information is read and stored in the data buffer 10, so that a route search taking the carpool lane into consideration can be performed.

The detailed operation will now be described for the case where a route search connecting a departure point and a destination is performed. When route searching is performed by the route search processing section 32, an intersection network list in a predetermined range including the departure point and the destination is prepared in advance and stored in the route search memory 36. For example, the predetermined range may be designated as one or a plurality of patterns encompassing a rectangular area of which the diagonal is a straight line connecting the departure point and the destination, or a range of which the radius is a straight line connecting the departure point and the destination. The intersection network list is a list obtained by extracting intersections (also including adjacent nodes other than the intersection node) from all nodes included in the road unit and gathering various data required for the route search processing for each intersection.

For example, the intersection network list includes for each intersection:

(1) intersection sequence number (serial numbers required for specifying this intersection network list);

(2) pattern number of the road unit in which this intersection is included;

(3) position on the node table;

(4) longitude/latitude;

(5) number of nodes constituting the intersection;

(6) sequence number of each adjacent intersection;

(7) road type until each adjacent intersection, the width thereof, whether any traffic control is being executed on the road, and its contents, if any;

(8) contents of the traffic control if there is a traffic control at this intersection;

(9) sequence number of the next previous intersection, determined by the route search; and

(10) total amount of cost from the departure point to this intersection.

However, (9) and (10) are registered at the time of executing the route search. Generally, this intersection network list is recorded beforehand in the DVD2, and the portion corresponding to the predetermined range established by the departure point and the destination is partially read and stored in the route search memory 36, but this intersection network list may be prepared every time when route searching is performed, based on the data in the road unit in the map data. Moreover, in this embodiment, only the intersection is designated as a node for the search, and the network list is expressed as an attribute of each node, but the network list may be expressed as an attribute of a link to thereby perform route searching.

In this embodiment described above, nodes and links are set by dividing the expressway having a carpool lane into a carpool lane and ordinary lanes other than the carpool lane, and the advancing/leaving points are regarded as intersections for setting nodes and links. Accordingly, in this embodiment, it is possible to perform route search taking the carpool lane into consideration, directly using the conventional route search method.

Figure 5:
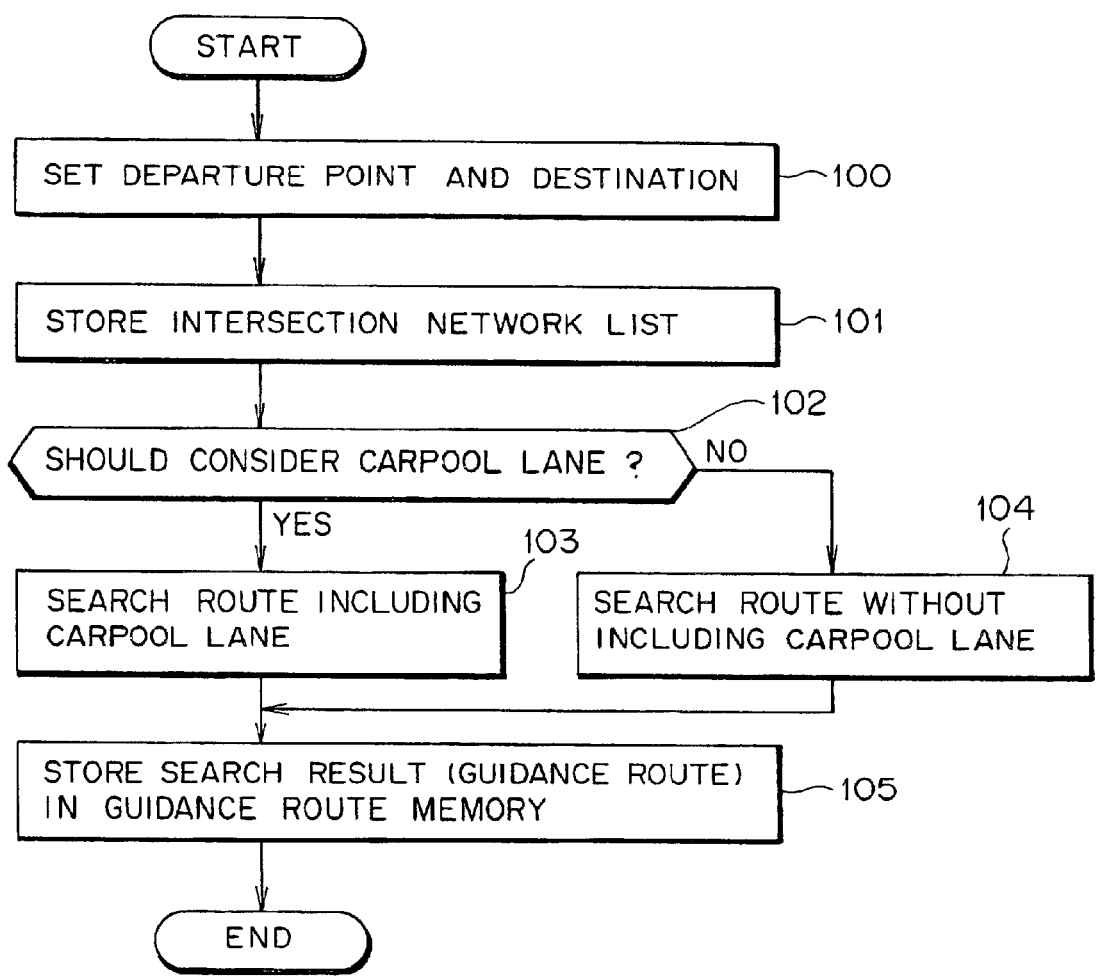
FIG. 5 is a flow chart explaining the overall operation of the navigation system, when route search is performed by setting a predetermined departure point and destination.

FIG. 5 is a flow chart explaining the overall operation of the navigation system in the case where route searching is performed by setting a predetermined departure point and a destination. When a search key on the remote control unit 4 is pressed, the route search processing section 32 sets a departure point and a destination for route searching (step 100), reads the map data included in a pattern in a predetermined range established by the departure point and destination into the data buffer 10, and stores all the intersection network lists included therein into the route search memory 36 (step 101). Then, the route search processing section 32 judges whether or not the carpool lane should be taken into consideration at the time of route searching (step 102). It is assumed that the setting whether or not the carpool lane is taken into consideration at the time of route searching is selected by a user by operating the remote control unit 4, at the time when various conditions for the route search (for example, the shortest distance, shortest time or the like) are set. Therefore, the route search processing section 32 refers to the set conditions to judge whether the carpool lane is to be taken into consideration or not.

If an affirmative judgment is made in step 102, the route search processing section 32 performs route search processing including the carpool lane in the search target (step 103). Specifically, since a lower cost is set for the link corresponding to the carpool lane than the link corresponding to the ordinary lane, a result of route searching is obtained in which the carpool lane is preferentially included, by performing a route search with respect to all nodes included in the intersection network list stored in the data buffer 10.

On the other hand, if a negative judgment is made in the above-described step 102, the route search processing section 32 performs route search processing without including the carpool lane in the search target (step 104). Specifically, by excluding nodes corresponding to the carpool lane (in the example shown in FIG. 4(B) described above, N1, N2, N5, N6) from the search target, a result of route searching is obtained in which the carpool lane is not taken into consideration.

When a guidance route between the set departure point and destination is searched by performing the processing in the above-described step 103 or step 104, the route search processing section 32 stores the nodes corresponding to the search result (guidance route) in order from the departure point toward the destination in the guidance route memory 34 (step 105). When processing in step 105 is completed, a predetermined search operation for a guidance route is completed.

Figure 6:
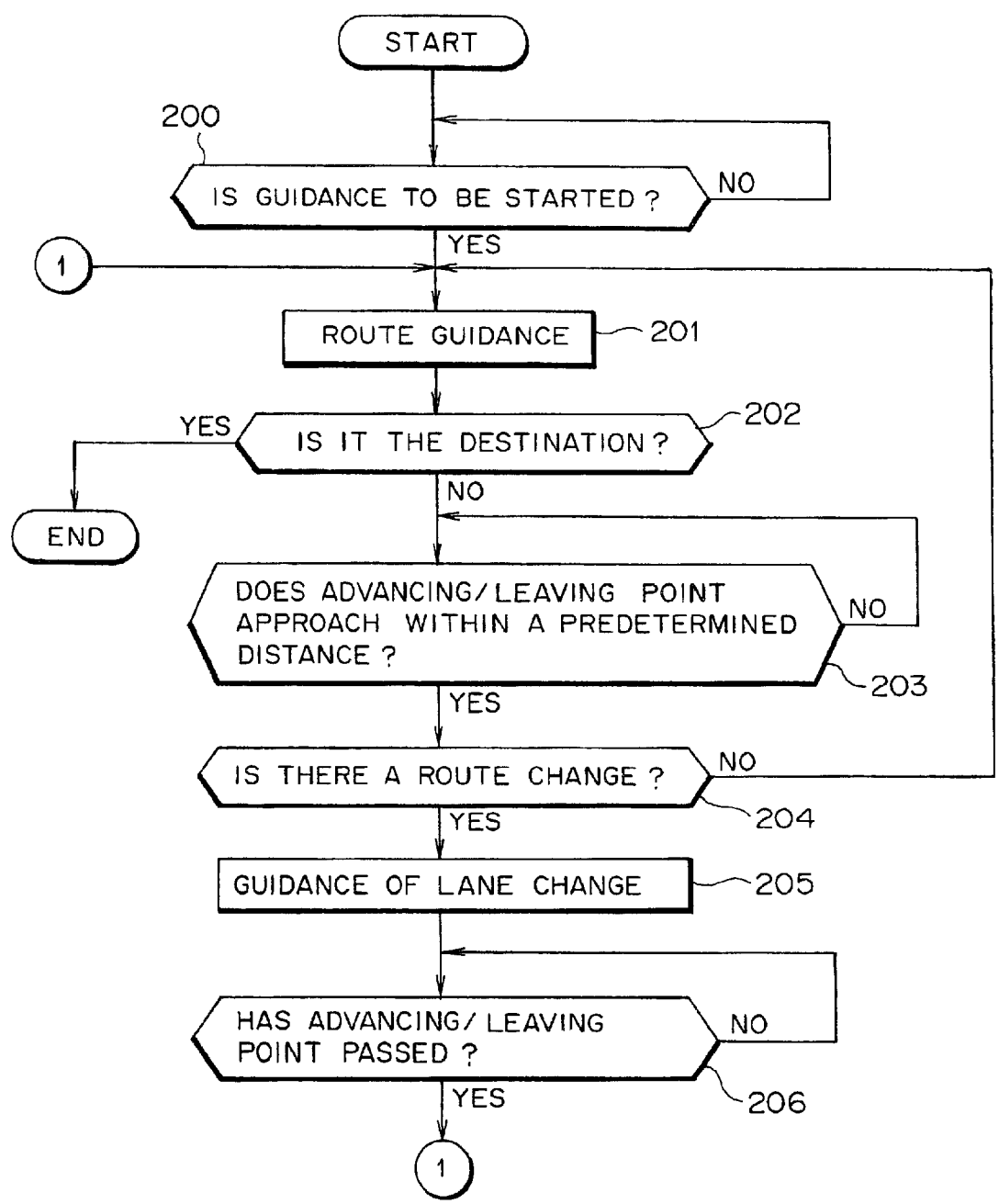
FIG. 6 is a flow chart explaining the operation of the navigation system at the time of route guidance.

The operation of the navigation system will now be described for the case where predetermined route guidance is performed along a guidance route set by taking the carpool lane into consideration. FIG. 6 is a flow chart of the operation of the navigation system at the time of route guidance, wherein a procedure when the lane change guidance is performed at the advancing/leaving point is mainly shown. When a route guidance mode key on the remote control unit 4 is pressed, a route guidance operation along a predetermined guidance route is started (steps 200, 201). Specifically, a guidance route is displayed on a map image of the VRAM 16 by the guidance route drawing section 38, and the vehicle position mark is displayed at the traveling position of the vehicle by the mark image drawing section 40 to thereby inform a user of the present position of the vehicle.

In parallel with such a route guidance operation, the route search processing section 32 reads the next node on the guidance route from the guidance route memory 34, and judges whether the vehicle has reached the destination or not, by checking if this node is the destination node (step 202). When the read node is the destination node, the route guidance operation is completed. When the read node is a node corresponding to the advancing/leaving point, data for specifying this node is transmitted to the carpool lane guide section 18.

Then, the carpool lane guide section 18 judges whether or not the advancing/leaving point approaches within a predetermined distance (step 203). Specifically, the carpool lane guide section 18 calculates the length of each link existing on the route until the advancing/leaving point, based on the map data (road unit or the like) stored in the data buffer 10, and checks if this value becomes less than a predetermined value (for example, 1 km), to thereby judge whether the advancing/leaving point has approached within a predetermined distance. If the advancing/leaving point is more than the predetermined distance away, the judgment processing in this step 203 is repeated.

When the advancing/leaving point has approached within a predetermined distance, the carpool lane guide section 18 judges whether the vehicle is to perform a route change at the approaching advancing/leaving point (step 204). Specifically, the carpool lane guide section 18 obtains a node corresponding to the approaching advancing/leaving point and a node which the vehicle is to travel after having passed this node from the route search processing section 32, and checks if a link connecting these nodes corresponds to a route when a lane change is performed at the advancing/leaving point, to thereby judge if the vehicle is to perform a route change or not. If it is judged that a route change is not to be performed, a negative judgment is made in step 204, and the process returns to step 201 to continue the predetermined route guidance.

When the vehicle is to perform the route change, an affirmative judgment is made in the above-described step 204, and the carpool lane guide section 18 performs predetermined lane change guidance visually and orally (step 205). For example, when the vehicle advances into the carpool lane from the ordinary lane, a lane guide map around the advancing/leaving point is displayed with an announcement of, for example, "Please change the driving lane to the carpool lane at the advancing/leaving point 1 km ahead." Similarly, when the vehicle leaves the carpool lane for the ordinary lane, a lane guide map around the advancing/leaving point is displayed with an announcement of, for example, "Please leave the carpool lane at the advancing/leaving point 1 km ahead and change the driving lane to the outermost ordinary lane."

Figure 7:
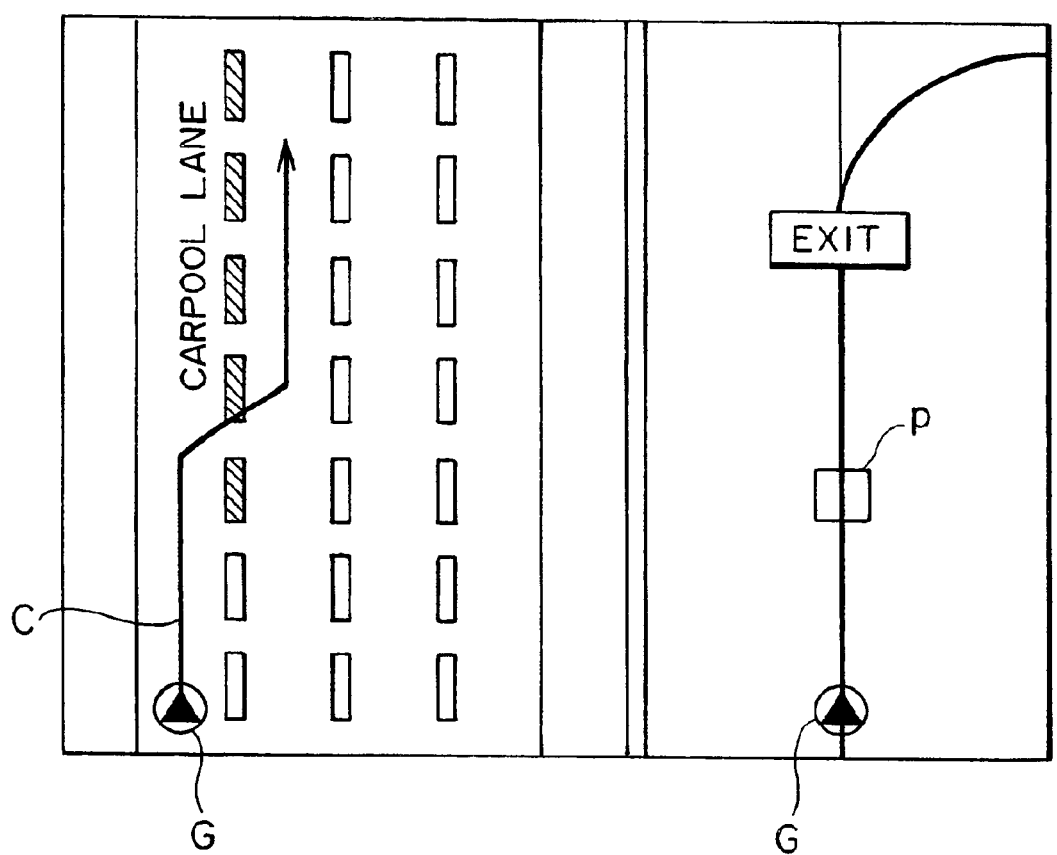
FIG. 7 is a diagram illustrating lane change guidance at an advancing/leaving point.

FIG. 7 is a diagram illustrating lane change guidance at the advancing/leaving point performed in the above described step 205, wherein there is shown an example of the lane change guidance when the vehicle leaves the carpool lane for the ordinary lane. In the example shown in FIG. 7, a map image around the position of the vehicle is displayed in about one-third of the display area on the right, and the guidance route is highlighted by a thick line. The image G denotes the position of the vehicle, and the area p denotes the position of the advancing/leaving point. An enlarged view of the advancing/leaving point denoted by the area p is displayed in about two-thirds of the display area on the left in FIG. 7, wherein the guidance route is denoted by the line C. In addition to such lane change guidance, an announcement is generated, such as "Please leave the carpool lane at the advancing/leaving point 1 km ahead and change the driving lane to the outermost ordinary lane."

Thereafter, the carpool lane guide section 18 judges whether the vehicle has passed the advancing/leaving point, based on the data output from the route search processing section 32 (data specifying the node) (step 206 in FIG. 6). If the vehicle has not passed the advancing/leaving point, the evaluation in step 206 is repeated. When the vehicle has passed the advancing/leaving point, an affirmative judgment is made in step 206, the process returns to step 201, and the operation following the route guidance processing is repeated.

In this manner, in an expressway having a carpool lane, the navigation system in this embodiment stores map data in the DVD 2, which includes road information regarding the advancing/leaving points where advancing and leaving between the ordinary lane and the carpool lane are permitted, and performs a predetermined navigation operation using the map data. Hence, route guidance is possible taking into consideration whether the carpool lane is to be used, and the lane change guidance for the advancing/leaving point where a route change is to be performed can be performed at an adequate timing. As a result, it becomes possible to drive the carpool lane efficiently.

In the above-described embodiment, the detailed operation has been described for the case where lane change guidance is made for a predetermined advancing/leaving point at the time of route guidance, but the navigation system in this embodiment can perform guidance regarding the advancing/leaving point even when the route guidance is not being performed. In this case, different from the lane change guidance at the time of route guidance, if there is an advancing/leaving point within a predetermined distance from the position of the vehicle, the user is informed of this. It is assumed that a user sets in advance whether such guidance of the advancing/leaving point is to be performed when route guidance is not being performed.

Figure 8:
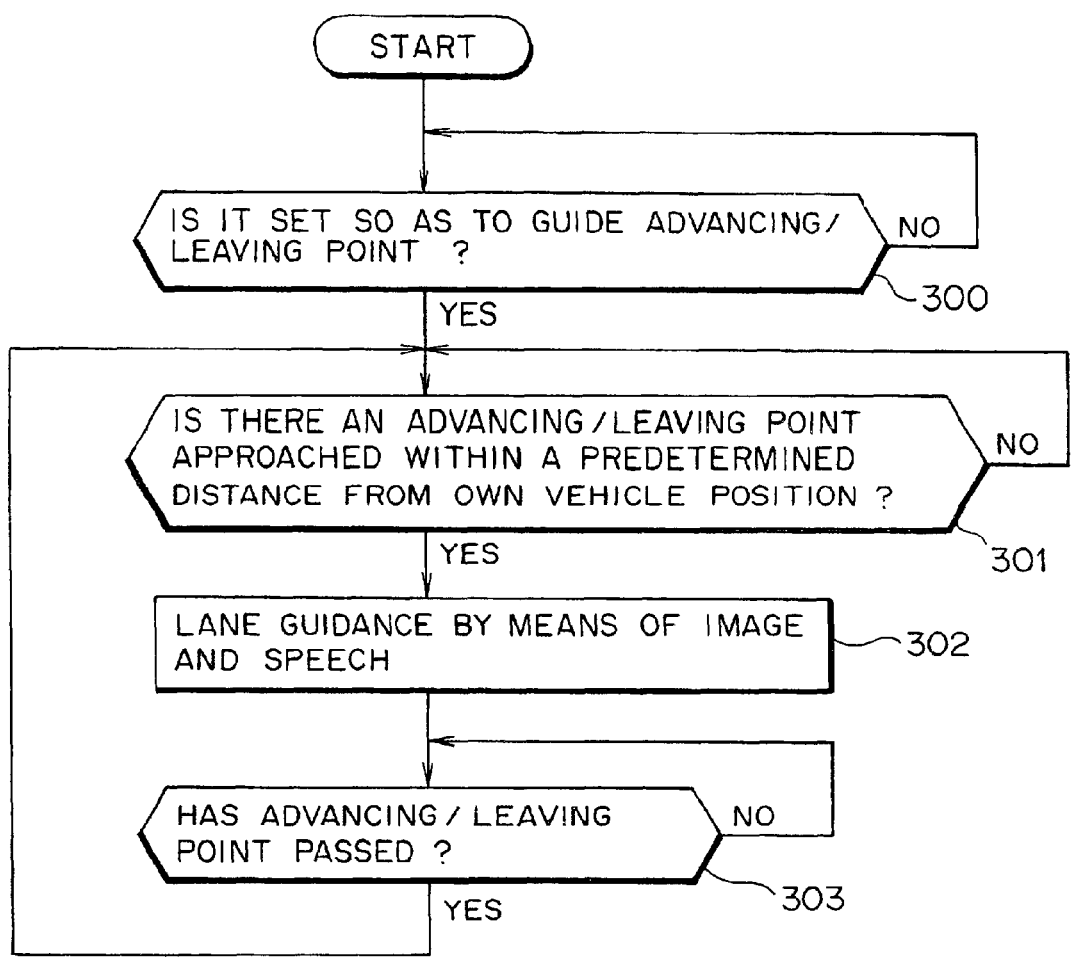
FIG. 8 is a flow chart explaining the operation of the navigation system, when guidance regarding the advancing/leaving point is performed when route guidance is not being performed.

FIG. 8 is a flow chart of the operation of the navigation system when guidance regarding the advancing/leaving point is performed when route guidance is not being performed. The guidance timing judgment section 20 judges whether or not it is set so as to perform guidance regarding the advancing/leaving point when route guidance is not being performed (step 300). When it is set so as to perform guidance (in the case of an affirmative judgment in step 300), the guidance timing judgment section 20 judges whether there is an advancing/leaving point approaching within a predetermined distance from the position of the vehicle or not (step 301). Specifically, for example, if it is assumed that the above-described predetermined distance is 1 km from the position of the vehicle, the guidance timing judgment section 20 judges whether there is an advancing/leaving point within the predetermined distance from the position of the vehicle, by obtaining the distance between the position of the vehicle to the advancing/leaving point, based on the present position and traveling direction of the vehicle obtained by the vehicle position calculation section 30, and map data (road unit or the like) stored in the data buffer 10. If the advancing/leaving point has not come within the predetermined distance from the position of the vehicle, a negative judgment is made, and the processing in step 301 is repeated.

If there is an advancing/leaving point approaching within the predetermined distance from the position of the vehicle, an affirmative judgment is made in the above-described step 301, and the guidance timing judgment section 20 instructs the carpool lane guidance section 18 to perform guidance regarding the advancing/leaving point. The carpool lane guidance section 18 having received this instruction obtains various data from the data buffer 10 to thereby perform guidance regarding the advancing/leaving point to which the vehicle is approaching visually and orally (step 302).

Figure 9:
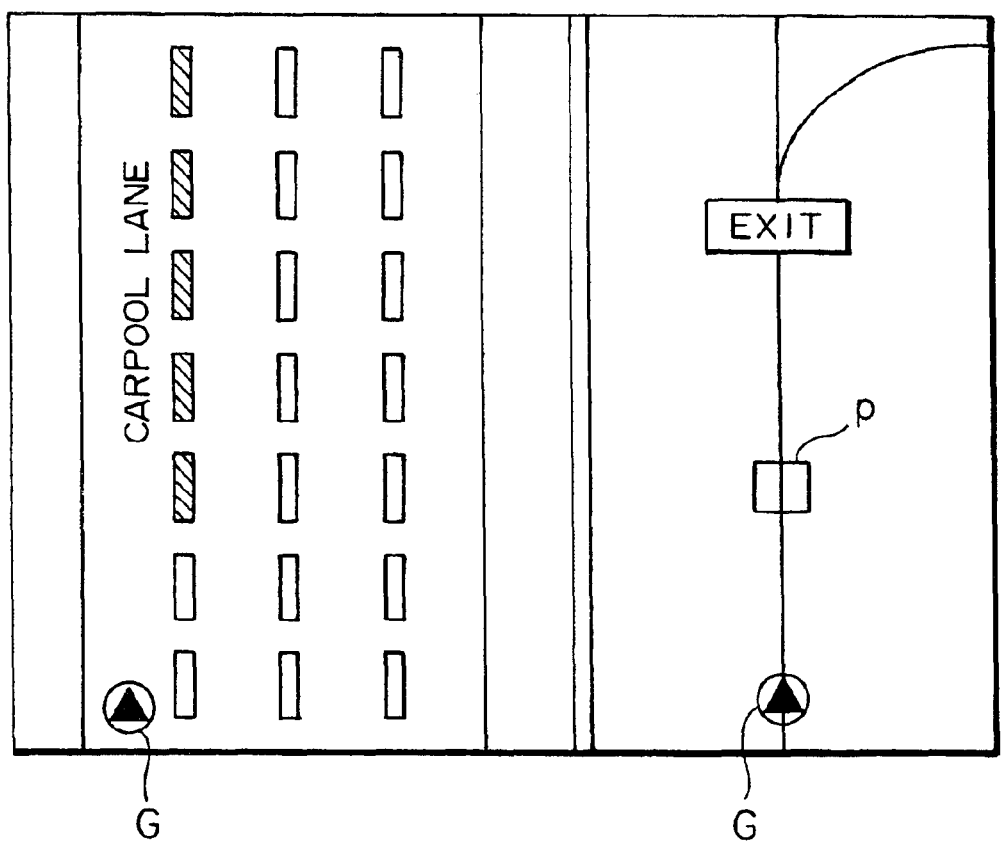
FIG. 9 is a diagram illustrating one example of guidance regarding the advancing/leaving point when route guidance is not being performed.

FIG. 9 illustrates one example of guidance regarding the advancing/leaving point when route guidance is not being performed. In FIG. 9, an image G denotes the position of the vehicle, and the area p denotes an advancing/leaving point. As in the above-described FIG. 7, a map image around the position of the vehicle is displayed in about one-third of the display area on the right in the image, and an enlarged view of the advancing/leaving point is displayed in about two-thirds of the display area on the left in the image. In addition to the guide image shown in FIG. 9, an announcement is generated, such as "There is an advancing/leaving point 1 km ahead."

Thereafter, the guidance timing judgment section 20 judges whether the vehicle has passed the advancing/leaving point whose guidance is now being performed, based on the position of the vehicle (step 303 in FIG. 8). If the vehicle has not passed the advancing/leaving point whose guidance is now being performed, the evaluation in step 303 is repeated. When the vehicle has passed this advancing/leaving point, the guidance timing judgment section 20 returns to step 301, and repeats the operation of judging whether there is an advancing/leaving point approaching within the predetermined distance from the position of the vehicle.

As described above, in this embodiment, the timing for performing a predetermined guidance notification regarding the advancing/leaving point is determined by the guidance timing judgment section 20 based on the position of the vehicle and the position of the advancing/leaving point, and the predetermined guidance notification is performed by the carpool lane guide section 18 at this timing. Hence, guidance regarding the advancing/leaving point can be performed at an adequate timing, even when route guidance is not being performed, enabling efficient driving in the carpool lane.

The present invention is not limited to the above-described embodiment, and various modifications are possible within the scope of the present invention. For example, in the above-described embodiment, information of nodes and links corresponding to the vicinity of advancing/leaving points in an expressway having a carpool lane is set by a method described above and shown in FIG. 3 or the like; however, it is not limited to the above-described method. For example, the advancing/leaving point can be represented as one intersection node, and information of nodes and links may be set in such a manner that in this node, the link corresponding to the carpool lane and the link corresponding to the ordinary lane intersects.

Moreover, in the above-described embodiment, with regard to guidance for the advancing/leaving point when route guidance is not being performed, guidance regarding the advancing/leaving point closest to the position of the vehicle is performed, but it is not limited thereto. For example, guidance regarding the advancing/leaving point next closest to the position of the vehicle may be performed simultaneously. In this manner, if guidance regarding the advancing/leaving point closest to the position of the vehicle and next closest to the position of the vehicle is performed, the user can easily judge if he/she should change the lane at this advancing/leaving point or not by checking his/her driving schedule.

Furthermore, in the above-described embodiment, predetermined guidance is performed both visually and orally, in both the lane change guidance at the time of route guidance and lane change guidance at the time when route guidance is not being performed; however, guidance may be performed only by either image or speech. For example, at the time when route guidance is not being performed, it may be the case that the user knows to some extent the road he/she is now driving, and guidance only by speech is sufficient. Hence, guidance by an image can be omitted, enabling simplification of the processing.

Also, at the time of route guidance, guidance regarding the advancing/leaving point may be performed earlier with an increase in the number of lanes. For example, in an expressway having six lanes on one side, considerable time may be required after leaving the carpool lane that is the innermost lane until moving over to the outermost lane in the ordinary lanes. Therefore, lane change guidance may be performed at an advancing/leaving point two or more before the expressway exit which the vehicle is to go through. In an expressway where there are only two or three lanes and it is considered that not much time is required for changing lanes, lane change guidance is performed at an advancing/leaving point closest to the expressway exit which the vehicle is to go through. The number of lanes can be judged by checking the width of the road from the road type flag shown in the above-described FIG. 2(C). Hence, by performing route searching taking the width of the road into consideration, the lane change guidance can be performed by taking the number of lanes into consideration.

In the above-described embodiment, the description has assumed the example of a carpool lane as designated on some roads in the United States, but the present invention is not limited thereto. The present invention can be applied to any case where, with regard to a partial lane in a plurality of lanes constituting the road, advancing/leaving relative to other lanes is permitted only in a predetermined authorized section.

As described above, according to the present invention, the navigation operation is performed taking into consideration restrictions regarding advancing or leaving between a partial lane and other lanes of a plurality of lanes, thereby enabling efficient driving in such a limited lane.

What is claimed is:

1. A navigation system comprising:
   a map data storage section for storing map data including road information regarding a partial lane in a plurality of lanes constituting a road, where advancing or leaving between a partial lane relative to another, adjacent lane is permitted only in a plurality of predetermined authorized sections, said road information regarding a partial lane comprising node and link data wherein a predetermined authorized section for advancing or leaving is stored as node data and a section of the partial lane extending between two authorized sections is stored as link data;
   a vehicle position detecting section for detecting the position of a vehicle; and
   a navigation processing section for performing a predetermined navigation operation, based on said position of the vehicle detected by said vehicle position detecting section and the map data stored in said map data storage section;
   wherein, when performing navigation from a vehicle position in a partial lane, across at least one other lane, and to a desired exit from a road, an authorized section for lane change guidance between the partial lane and another, adjacent lane is selected based on the location of the authorized section, the position of the vehicle along the partial lane, the location of the desired road exit, and one of the width of the road and the number of lanes in the road.

2. A navigation system according to claim 1, wherein said navigation processing section comprises:
   a timing judging section for judging a timing for performing predetermined guidance notification regarding said authorized section, based on said position of the vehicle and the position of said authorized section; and
   a guidance notification section for performing said guidance notification at a timing judged by said timing judging section.

3. A navigation system according to claim 2, further comprising:
a driving lane instruction section for setting whether or not the vehicle is to travel said partial lane; and
wherein said navigation processing section further comprises a route search processing section for performing route search processing, taking into consideration the availability of said partial lane, depending on the setting of said driving lane instruction section.

4. A navigation system according to claim 3, wherein said navigation processing section further comprises a borderline display section for displaying a borderline between said partial lane and said other lane in said authorized section in a color different from that of other borderlines.

5. A navigation system according to claim 2, wherein said guidance notification section performs said guidance notification both by guidance display and spoken announcement.

6. A navigation system according to claim 2, wherein said guidance notification section performs said guidance notification by displaying an enlarged view of an advancing/leaving point.

7. A navigation system according to claim 2, wherein said guidance notification section performs said guidance notification by spoken announcement.

8. A navigation system according to claim 2, wherein said partial lane is a carpool lane.

9. A navigation system comprising:
a map data storage section for storing map data including road information regarding a partial lane in a plurality of lanes constituting a road, where advancing or leaving between a partial lane relative to another, adjacent lane is permitted only in a plurality of predetermined authorized sections, said road information regarding a partial lane comprising node and link data wherein a predetermined authorized section for advancing or leaving is stored as node data and a section of the partial lane extending between two authorized sections is stored as link data;
a vehicle position detecting section for detecting the position of a vehicle;
a route search processing section for searching a driving route and setting the guidance route, taking the use of said partial lane into consideration;
a timing judging section for judging a timing for performing predetermined guidance notification regarding said authorized section, based on the position of said authorized section on said guidance route and said position of the vehicle; and
a guidance notification section for performing said guidance notification at a timing judged by said timing judging section;
wherein, when performing navigation from a vehicle position in a partial lane, across at least one other lane, and to a desired exit from a road, an authorized section for lane change guidance between the partial lane and another, adjacent lane is selected based on the location of the authorized section, the position of the vehicle along the partial lane, the location of the desired road exit, and one of the width of the road and the number of lanes in the road.

10. A navigation system according to claim 9, wherein said partial lane is a carpool lane.

11. A navigation system according to claim 10, wherein said route search processing section searches the driving route by setting the cost of a link corresponding to the carpool lane lower than the cost of a link corresponding to an ordinary lane.

12. A navigation system according to claim 10, wherein said route search processing section sets the guidance route such that as the number of lanes increases, guidance regarding the carpool lane is performed earlier.

13. A navigation system according to claim 10, wherein said route search processing section further comprises a driving lane instruction section for setting whether or not the driving route is searched taking the use of a partial lane into consideration.

14. A navigation system comprising:
a map data storage section for storing map data including road information regarding a carpool lane, said road information separately describing the carpool lane as link and node data;
a vehicle position detecting section for detecting the position of a vehicle;
a route search processing section for searching a driving route and setting the guidance route, taking the use of said carpool lane into consideration;
a timing judging section for judging a timing for performing guidance notification of a route change regarding advancing/leaving points where advancing or leaving between a carpool lane and adjacent ordinary lanes on said guidance route is permitted, at the time of route guidance, and for performing guidance notification that the vehicle is approaching said advancing/leaving point, based on the advancing/leaving points and said position of the vehicle, when the route guidance is not being performed, and
a guidance notification section for performing guidance notification of a route guidance regarding said advancing/leaving points at the time of route guidance, and performing guidance notification that the vehicle is approaching said advancing/leaving point, when the route guidance is not being performed;
wherein, when performing guidance notification at the time of route guidance from a vehicle position in a carpool lane, across at least one other lane, and to a desired exit from a road, an advancing/leaving point is selected based on the location of the advancing/leaving point, the position of the vehicle along the carpool lane, the location of the desired road exit, and one of the width of the road and the number of lanes in the road.

15. A route guidance method in a navigation system comprising:
storing map data including road information regarding a partial lane in a plurality of lanes constituting a road, where advancing or leaving between a partial lane relative to another, adjacent lane is permitted only in a plurality of predetermined authorized sections, said road information regarding a partial lane comprising node and link data wherein a predetermined authorized section for advancing or leaving is stored as node data and a section of the partial lane extending between two authorized sections is stored as link data;
detecting the position of a vehicle;
searching a driving route and setting the guidance route, taking the use of said partial lane into consideration;
judging a timing for performing predetermined guidance notification regarding said authorized section, based on said authorized section on said guidance route and said position of the vehicle; and
performing said guidance notification at a timing judged by said timing judging section;

wherein, when performing navigation from a vehicle position in a partial lane, across at least one other lane, and to a desired exit from a road, an authorized section for lane change guidance between the partial lane and another, adjacent lane is selected based on the location of the authorized section, the position of the vehicle along the partial lane, the location of the desired road exit, and one of the width of the road and the number of lanes in the road.

16. A route guidance method in a navigation system according to claim 15, wherein said guidance notification is performed both by guidance display and spoken announcement.

17. A route guidance method in a navigation system according to claim 15, further comprising:

setting whether or not a driving route is searched taking the use of the partial lane into consideration.

18. A route guidance method in a navigation system according to claim 15, wherein said partial lane is a carpool lane.

19. A route guidance method in a navigation system according to claim 15, wherein said guidance notification is performed by displaying an enlarged view of an advancing/leaving point.

20. A route guidance method in a navigation system according to claim 15, wherein said guidance notification is performed by spoken announcement.

* * * * *